April 15, 1941.  F. G. MANSON  2,238,876
AERIAL TRAILER
Filed Aug. 14, 1939  2 Sheets-Sheet 1
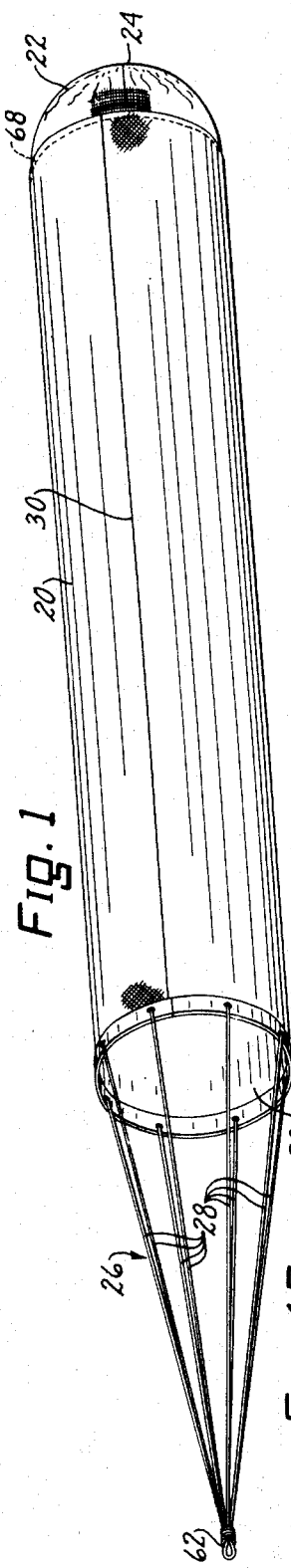
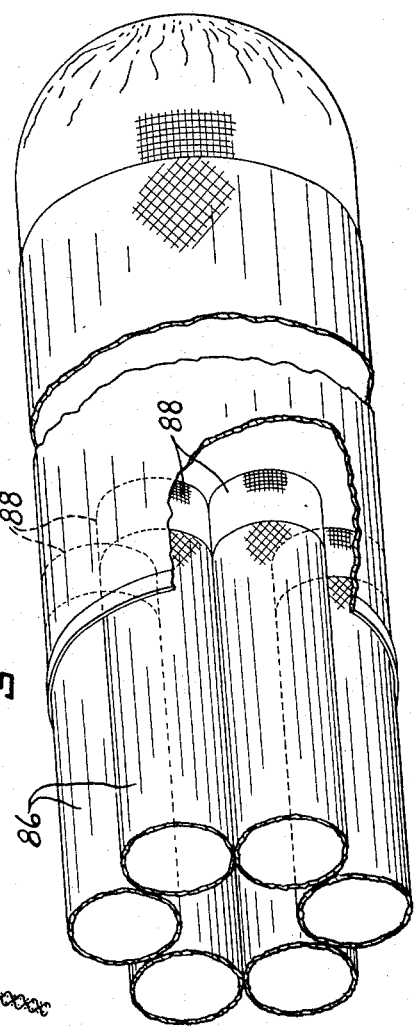
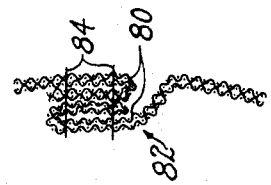
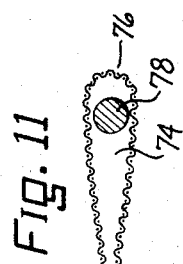
INVENTOR
FRANK G. MANSON
By Richard Van Busum
HIS ATTORNEY April 15, 1941.　　　F. G. MANSON　　　2,238,876
AERIAL TRAILER
Filed Aug. 14, 1939　　　2 Sheets-Sheet 2
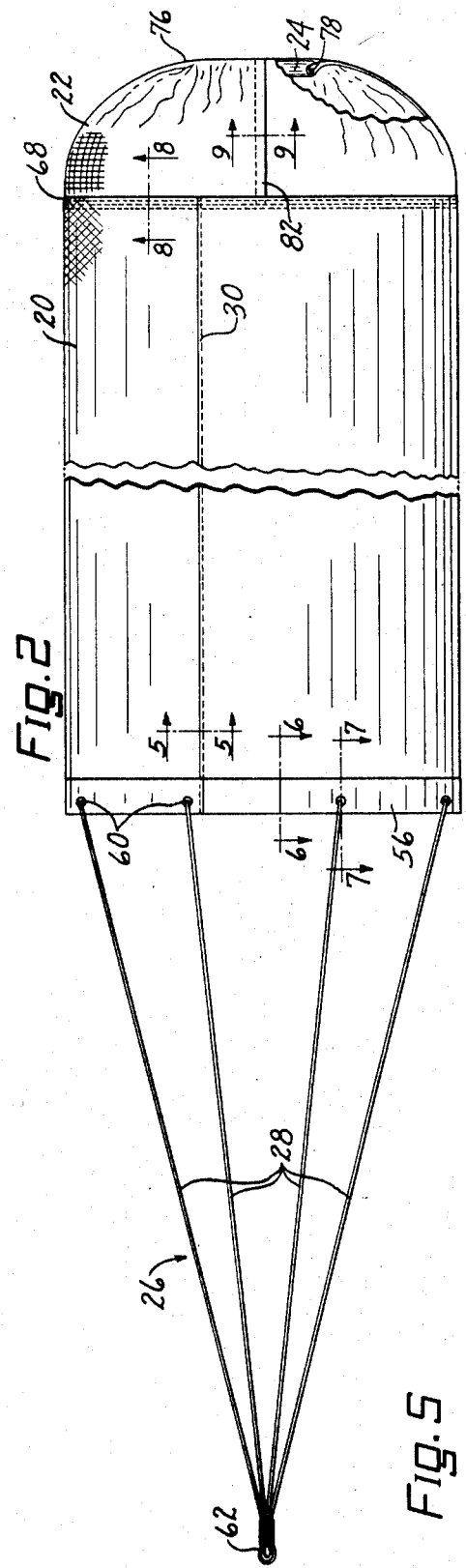
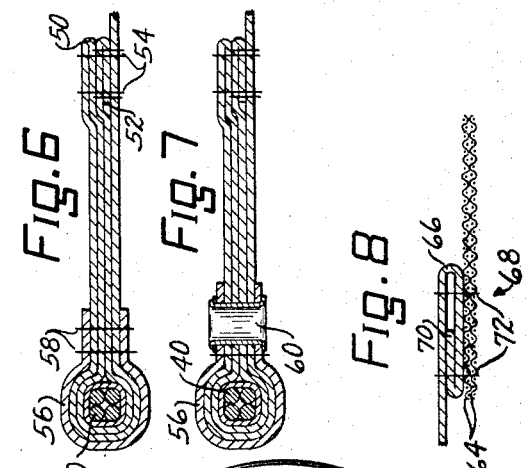
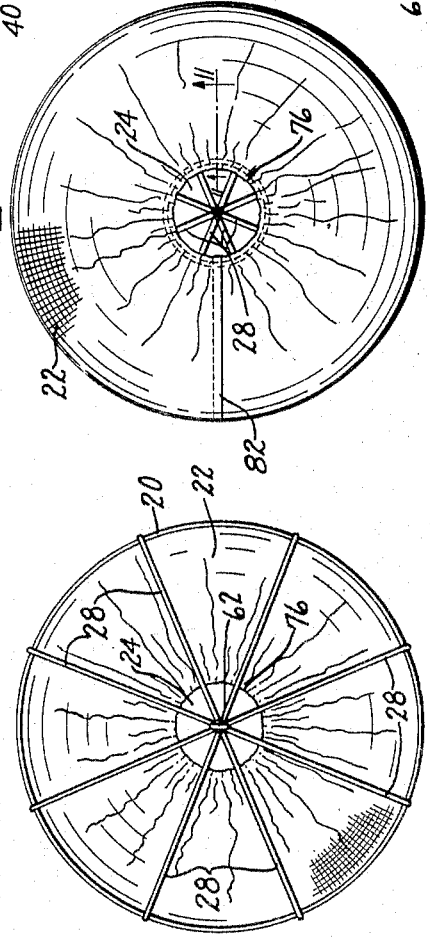
INVENTOR
FRANK G. MANSON
By Richard Van Buren
HIS ATTORNEY Patented Apr. 15, 1941

2,238,876

UNITED STATES PATENT OFFICE 2,238,876

AERIAL TRAILER

Frank G. Manson, Dayton, Ohio

Application August 14, 1939, Serial No. 290,057

23 Claims. (Cl. 273—105.3)

This invention relates to aerial trailers for use in towing behind an airplane as a target, and which may be used for other purposes, such as advertising.

Heretofore, aerial trailers for tow targets have generally been made of a sleeve type construction, with the sleeve being made entirely of cloth. The more improved type trailers were generally provided with a restricted rear opening in order to provide a flat plate resistance to aid in the inflation of the sleeve and to prevent flutter and oscillation. Even with this improvement, great difficulty was encountered in accomplishing stability and in the prevention of flutter due to the turbulence of the air at the spillway. So great was the tendency to flutter that the targets would oft times tear themselves to pieces in the air.

These problems are complicated by the further requirements that the bulk of the folded target be kept to a minimum consistent with the maximum size of target when inflated, and that the target should be capable of being so packaged that it could be passed through a relatively small aperture in the airplane for launching.

To overcome these difficulties, various artifices have been employed without success, and in each case the construction of the target has been further complicated, thus adding to the cost and expense of making the same. Furthermore, additional structures add greatly to the already existing drag of a sleeve type target, thereby limiting the size of the sleeve and consequently, the effective area.

It is therefore an object of this invention to solve these difficulties by the simple expedient of forming the restricted rear portion or tail of a mesh material of suitable characteristics. The material used is semi-rigid, yet light in weight, lends itself to simplicity and economy of construction, and provides a quality of operation not heretofore accomplished.

It is a further object of this invention to provide a novel reenforcing ring for the forward opening of trailers of the sleeve type.

It is another object of this invention to provide, in an aerial trailer having a sleeve as the main body portion thereof and having a plurality of auxiliary sleeves grouped around the sleeve of said main body portion, for the construction of said auxiliary sleeves in part or entirely of a semi-rigid mesh material.

It is still another object of this invention to provide, in an aerial trailer having a sleeve as a main body portion and a plurality of auxiliary sleeves grouped around said main sleeve, for the construction of said sleeves of such a material that it will resist fraying and disintegration under the stresses encountered in normal operation.

With these and incidental objects in view, the invention includes certain novel features of construction and combinations of parts, the essential elements of which are set forth in the appended claims, the preferred forms and embodiments of which are hereinafter described with reference to the drawings which accompany and form a part of this specification and in which like reference numerals refer to like parts.

Figure 1 is a perspective view of the invention as inflated in flight.

Figure 2 is a side elevation view.

Figure 3 is a front elevation view.

Figure 4 is a rear elevation view.

Figures 5, 6, 7, 8 and 9 are enlarged section views taken on the lines 5—5, 6—6, 7—7, 8—8, and 9—9, respectively, of Figure 2.

Figure 10 is an enlarged elevation view of the reenforcing opening ring.

Figure 11 is an enlarged section view taken on the line 11—11 of Figure 4.

Figure 12 is a fragmentary perspective view of a modification of the invention, with the front end of the target broken away.

Referring to the drawings, the invention, as illustrated, comprises a cylindrical sleeve 20, constituting the main body portion of the trailer, a posterior portion 22 integrally secured to said sleeve, having a restricted opening 24 therein and an attaching means 26 being, as illustrated, in the form of a bridle comprised of a plurality of cables 28.

The cylindrical sleeve portion 20 may be made of any suitable material, but is preferably constructed of light, closely-woven fabric such as is well known in the art. It may be formed of a plurality of sections sewed together, or be formed of a single piece of material with one seam 30, on the side, as shown in Figure 2. The seam 30 may be made in any well known manner, but as illustrated in Figure 5, is formed by interlocking the doubled edges 32 of the fabric and securing same together with two rows of stitching 34. The sleeve, for satisfactory results as a target for use with modern type military aircraft, is constructed about 45 feet in length and about 4 feet in diameter, but it is understood, of course, that these dimensions are descriptive only, and that they may be varied to suit the needs of the target or for adaptation to the airplane by which it is to be towed.

To provide for the opening of the sleeve upon release from the aircraft, a ring 36 is inserted in the mouth 38 of the sleeve. This ring may be of any suitable type of construction, but a preferred type of ring, as shown in Figures 6 and 10, is made by using four convolutions of piano wire 40 of .146" size, and securely binding the ends by wrapping with copper wire 42 at the points 44 and 46 (Figure 10). The convolutions of the piano wire are further secured together by other wrappings 48 of the copper wire at suitably spaced points around the circumference. The ring 36 is secured in the mouth of the sleeve, as shown in Figure 6, by looping a doubled end of the fabric material over the ring 36 so that four plies of material extend back of the ring about 4 inches. The loose end 52 of the fabric material is tucked under and the five plies caught with two rows of stitching 54 at the rearward end of the doubled cloth. A strip 56 of linen webbing is placed over the portion covering the ring. The superimposed pieces of cloth are then stitched together in a suitable manner, care being taken to stitch as closely as possible to the wire ring, as shown at 58, in order to make the cloth fit tightly around it, thus preventing wear. At suitable points in the linen webbing are located grommets 60, as shown in Figure 7, for attaching the bridle ropes thereto. The advantage of the type of ring just described is that it may be folded, in packing, in the shape of a figure 8, thus reducing the overall size of the target as packaged, to one-fourth its original size, thus enabling it to be deployed from the airplane through a smaller opening.

The bridle 26 is formed of any suitable number of cables 28 with eight, as shown, being a desirable number. These cables may be made of any suitable material, but are preferably made of ¼" manila rope. The ropes are attached to the main sleeve by tieing or splicing to the grommets 60. The ropes are collected at their forward ends in a loop 62 for attachment to the end of a tow cable (not shown). The bridle in the preferred embodiment is generally 8 feet in length.

The posterior portion 22 of the target according to the invention is made of a mesh material. While various types of mesh material may be used with good results, the greatest advantages have been found to be obtained by using a wire mesh material of basket weave construction, made of .010" steel or copper wire. While the mesh may be of any suitable size, a range from 8 x 8 to 12 x 12 mesh per inch, or an equivalent size, has been found to give the best results and will provide the desired appearance of opacity in flight and at the same time offer a limited resistance to the passing of air therethrough.

The preferred manner of construction of the posterior portion of the target is to use a double thickness of the material, lapping the free ends 64 with the trailing end 66 of the fabric sleeve at the seam 68, as shown in Figure 8. The trailing end of the fabric comprising the sleeve is doubled under, with the free end 70 again doubled between the doubled portion to protect it from fraying. The free ends 64 of the mesh material are selvedged, and then the lapped sections are stitched together by wire or thread or fastened by other suitable means. In practice, two rows 72 of stitching with a 3-cord linen thread have been used. In order to reduce resistance to air, it is desirable to lap the mesh material interiorly of the fabric sleeve. By thus using a double thickness of the mesh material, a circumferential passageway 74 is formed and in the extreme trailing end 76 is disposed a section of rope or cable 78. The adjacent edges 80 of the mesh material at the seam 82 are joined as shown in Figure 9, wherein note that they are each doubled inwardly, lapped, and then stitched. The stitching in the embodiment shown consists of two rows 84 of linen thread.

The purpose of the rope or cable 78 is to restrict the outlet 24 at the trailing end of the sleeve 22. The cable or rope 78 has a normal diameter which is considerably less than the diameter of the passageway of the sleeve 20. Since the material for the posterior portion is cut in the full and uniform circumferential dimensions of the sleeve 20, the effect of this cable 78 is to pucker the portion 22 at the extreme trailing end 76 of the trailer and provide the restricted outlet 24. The flat plate area produced by the restriction creates the drag necessary to inflate the target as it is towed by the aircraft, and causes the target to be pulled in a given path, yet the open area of the outlet opening 24 as defined by the rope or cable 78, combined with the effective porosity of the mesh, is such as to permit the air to spill through the target without unnecessary restriction upon the speed of the aircraft or the creation of excessive pressure in the sleeve.

A further purpose of this type of construction for the posterior portion is to enable the rear opening or spillway 24 to center itself with respect to the surrounding flat plate area thus established. By virtue of the loose or free-floating rope 78 in the passageway, the opening 24 is adapted to assume the shape of a parabola or other geometric design in making itself concentric with the main sleeve. In this manner, the flat plate area constitutes an annulus of uniform thickness and distributes the drag forces uniformly throughout the circumference of the target.

The use of the semi-rigid mesh material for the posterior portion provides several advantages. A particular advantage is that it not only provides the functions normally provided by a restricted posterior portion of fabric, namely, the provision of a sufficient flat plate area to cause the sleeve to inflate, and the provision of a sufficient rear opening to permit the moving air to spill through the sleeve, but also enables the air moving through the target to partially exhaust through the mesh, thereby decreasing the turbulence at the spillway so as to stabilize the motion of the trailer in flight. In addition to the excellent stability accomplished with a minimum of drag, thus making it possible for this target to be towed at the high speeds possible with modern day aircraft in the range of 200 miles per hour, the more complicated structures used in many targets heretofore, such as cross vanes of fabric for the bridle and cell-like structures within the main sleeve heretofore often used for accomplishing stability, may be eliminated. The elimination of these structures not only makes this improved trailer more economical to manufacture, but also helps to eliminate flutter and drag due to the friction of the said structures with the moving air.

The embodiment of this invention shown in

Figure 12 is similar in arrangement and general style of construction to the aerial trailer described in my co-pending application, Serial No. 25,168, but differs in that the auxiliary sleeves 86 arranged around the inner periphery of the main sleeve and at the fore end thereof, are formed with the rear portions 88 constructed of a mesh material similar to that described above for the restricted portion of the large sleeve. The small sleeves may be constructed entirely of mesh material, but it is sufficient for the purpose of resisting fraying and disintegration to construct only a small portion at the rear of the mesh material, a suitable fraction of length to be constructed of the mesh material being one-sixth. The mesh material is attached to the fabric part of the small sleeve in the same way as the mesh material for the restricted portion of the large sleeve is attached to the fabric portion of the large sleeve. A further advantage of the use of the mesh material is that no hem is required at the trailing edge, thereby reducing the amount of drag and contributing to the economy of manufacture.

In the event this invention is to be used in target practice in which different combat groups engage, using bullets or projectiles marked with a designating paint for each different group, the wire mesh tail portion should preferably have the individual wires covered with a contrasting colored, flexible, adhesive covering in order that the different paint colors with which the bullets or projectiles from the different firing sources are marked, will be registered thereon so as to determine the scores of the different firing sources. The most common method of accomplishing this is to weave the mesh of wire covered with a cotton yarn. However, any suitable method of providing a flexible covering capable of being colored may be used, such, for instance, as spraying with a white rubber solution.

The trailer is launched from the airplane in the well known manner. By virtue of the resiliency of the flexible ring installed in the mouth of the sleeve, the immediate opening of the sleeve is assured upon deploying.

When sufficient hits have been made upon a target, or when it has become disabled, it may be released in the well known manner and a new target may be deployed from the aircraft in the same manner as the first one.

While the mechanism and construction herein shown and described is admirably adapted to fulfill the objects primarily stated, it is to be understood that it is not intended to confine the invention to the forms or embodiments herein disclosed, for it is susceptible of embodiment in various forms all coming within the scope of the claims which follow.

I claim:

1. An aerial trailer for attaching to an aircraft or other vehicle comprising a sleeve as the main body portion and a partially restricted rear portion made of a mesh material, said sleeve having a form shaping ring at the opening thereof, said ring being formed of a plurality of convolutions of flexible wire.

2. In an aerial display device adapted to be towed by an aircraft, the combination of a sleeve-shaped main body portion constructed of readily collapsible material, a ring constructed of yieldable material and extending around the forward end of the sleeve to hold the mouth of said sleeve open, means for attaching the towing harness to the display device, and a rear portion of semi-rigid, open-mesh material attached to the rearward end of the sleeve shaped portion to which it conforms in circumferential outline, the rearward end of said rear portion forming a restricted opening or spillway through which air flowing through the sleeve-shaped main body portion is discharged, the material of said rear portion being sufficiently rigid to resist and dampen the forces causing flutter in said rear portion if they should occur and the mesh of the material of the rear portion being of a size small enough to resist the flow of air therethrough to cause the sleeve-shaped portion to become inflated but being of a size large enough to allow some air to pass therethrough to guide the flow of air leaving the sleeve-shaped portion and to reduce the amount of air that must flow through the spillway, thereby reducing the forces tending to cause fluttering in said rear portion.

3. In an aerial trailer of the sleeve type having an open mouth at the fore end thereof, a flexible ring disposed in said open mouth end, said ring being formed of a plurality of convolutions of resilient wire and having means for keeping said convolutions in contiguous relationship.

4. An aerial trailer adapted for towing behind an aircraft or other vehicle, comprising a sleeve as the main body portion, having a partially restricted rear portion made of a mesh woven of wire covered with an adhesive, flexible material.

5. An aerial trailer comprising a sleeve as the main body portion and having a plurality of auxiliary sleeves associated therewith, said auxiliary sleeves having the rear portions thereof formed of a mesh material.

6. An aerial trailer comprising a sleeve as the main portion and a partially restricted rear portion, said rear portion being made of a mesh material having a mesh of a size small enough to appear substantially opaque at the distance intended for use and of a size large enough to offer limited resistance to the passage of air therethrough to cause the sleeve to become inflated but allowing some air to pass through the mesh to stabilize the flow of air in the sleeve and reduce fluttering in said rear portion of said sleeve; and means for attaching said trailer to an aircraft or other vehicle to be towed thereby.

7. An aerial trailer comprising a sleeve as the main body portion and a rear portion having a spillway or opening of less diameter than the main body portion thereof through which air passes when the trailer is towed, said rear portion being formed of a mesh material having a mesh of a size small enough to appear substantially opaque at the distance intended for use and of a size sufficiently large to offer a limited resistance to the passage of air therethrough to cause the sleeve to become inflated but allowing some air to pass through the mesh to reduce the amount of air passing through the spillway and thus eliminating flutter in said rear portion; and means for attaching said trailer to an aircraft or other vehicle.

8. An aerial trailer comprising a sleeve as the main body portion and a rear portion rounded so as to terminate with a diameter substantially less than the diameter of the sleeve, and formed of wire mesh material, said material being sufficiently rigid to resist the forces causing flutter if they should occur in the rear portion when the trailer is towed and having a mesh of a size small enough to create a limited resistance to the flow of air through the sleeve to cause the sleeve to become inflated, but of a size large enough to allow some air to pass through the mesh to release air throughout substantially the diameter of the main body portion and thus reduce the forces tending to cause flutter in said rear portion; and means for towing said trailer.

9. An aerial trailer comprising in combination a tubular sleeve of substantially non-porous material; a partially restricted rear portion connected to said sleeve and made of semi-rigid open-mesh material, said rear portion restricting the flow of air through the sleeve, so that the substantially non-porous material will cause said sleeve to become inflated, and said rear portion allowing air to pass through the open mesh thereof to release and direct the flow of air leaving the sleeve to eliminate fluttering in said rear portion of the trailer and to stabilize the flight of the trailer; and means for attaching the trailer to an aircraft or other vehicle.

10. An aerial trailer adapted to be towed at high speeds by an aircraft or other vehicle, comprising in combination a tube of substantially non-porous material to direct an airstream through the trailer when towed at high speeds, the airstream becoming turbulent as it passes through the sleeve; and an open-mesh material forming a rear portion having a restricted opening therein, said rear portion resisting the flow of air through the tube to cause the tube to inflate, said open-mesh material releasing a portion of the air through the mesh thereof in order to break up the turbulence of the airstream and to diminish the amount of air which must pass through the restricted opening, thus eliminating fluttering of the rear portion of the trailer when it is towed at high speeds.

11. An aerial trailer comprising a main tubular sleeve and a rear portion of semi-rigid, open-mesh material, the material of said rear portion being resistant to the forces causing flutter therein when the trailer is towed and allowing air to pass through the mesh to direct and control the flow of air passing through the sleeve, when the trailer is towed, to thereby eliminate fluttering in the rear portion of the trailer when it is towed at high speeds.

12. An aerial trailer comprising a fabric sleeve as the main body portion and a rear portion made of an open-mesh material, said rear portion having the rear end thereof drawn together to form an opening of less diameter than the diameter of the main body portion; a plurality of small sleeves arranged around the inner circumference of the fore part of the main body portion and operating to direct the flow of air through the trailer to stabilize the fore part of the fabric sleeve; said open-mesh material having a mesh of a size small enough to create a limited resistance to the flow of air through the trailer to cause the sleeves to become inflated but of a size large enough to allow some of the air to pass therethrough to reduce the volume of air passing through the opening of less diameter and to control the release of the air from the rear end of the trailer so as to reduce the forces causing flutter in the rear portion of the trailer, said small sleeves and open-mesh material of the rear portion thereby stabilizing the flight of the trailer; and means for towing the trailer.

13. An aerial trailer comprising a main body portion formed as a sleeve and made of substantially non-porous material and a rear portion formed with the rear end thereof drawn together to form an opening of less diameter than the diameter of the main body portion and made of semi-rigid open-mesh material; a plurality of small sleeves arranged around the inner circumference of the fore part of the main body portion with the longitudinal axes of the smaller sleeves parallel to the longitudinal axis of the sleeve forming the main body portion, said small sleeves being made of substantially non-porous material and having the rear portions thereof made of semi-rigid open-mesh material; said small sleeves directing the flow of air through the fore part of the main body portion of the trailer and the semi-rigid open-mesh material at the rear portion of each of the small sleeves being rigid enough to resist the forces tending to cause flutter in the small sleeves when the trailer is towed, but having a mesh sufficiently large to allow air to pass through the mesh to keep the flat plate drag of the small sleeves at a minimum if they should flutter; said semi-rigid open-mesh material of the rear portion of the trailer being rigid enough to resist the forces tending to cause flutter in the rear portion of the trailer, and having a mesh of a size small enough to offer a limited resistance to the flow of air through the trailer to cause the trailer to become inflated when towed, but of a size large enough to allow some air to pass through the mesh to reduce the volume of air passing through the opening of smaller diameter and control the flow of air leaving the trailer so as to reduce the forces causing flutter in the rear portion of the trailer, whereby said small sleeves and the material of which the ends of the small sleeves and the trailer are made operate to stabilize the flight of the trailer and reduce fluttering of the various sleeves to a minimum; and means for towing said trailer.

14. An aerial trailer comprising a sleeve portion and a rear portion, said rear portion being restricted in diameter to form a central opening therein through which air flows when the trailer is towed, said air flowing through the trailer becoming turbulent as it passes through the central opening, and said rear portion being made of open-mesh material having a mesh of a size small enough to create a limited resistance to the passing of air through the mesh to cause the sleeve to become inflated, but of a size large enough to allow some air to spill therethrough to reduce the volume of air passing through the central opening and to guide the air leaving the sleeve so as to reduce the turbulence of the air and thereby eliminate the forces causing flutter in the rear portion of the trailer; and means for attaching said sleeve to an aircraft to be towed thereby.

15. An aerial trailer comprising in combination a tubular sleeve of substantially non-porous material; a partially restricted rear portion connected to the sleeve and made of semi-rigid open-mesh material having sufficient rigidity to resist the forces causing flutter in said rear portion of the trailer and having mesh of sufficient porosity to release and direct the flow of air leaving the sleeve to reduce fluttering in said rear portion of the trailer and stabilize the flight of the trailer; and means for attaching the trailer to an aircraft or other vehicle.

16. An aerial trailer adapted to be towed by an aircraft or other vehicle comprising in combination a tubular sleeve of substantially non-porous material to direct air through the sleeve to the rear thereof; and a rear portion connected to said sleeve and made of semi-rigid mesh material having higher porosity than said sleeve, the mesh operating to release air therethrough to break up the flow of air leaving said sleeve to reduce flutter in said rear portion and to stabilize the flight of the trailer when towed at speeds in excess of 100 miles per hour.

17. An aerial trailer comprising in combination a tubular sleeve of substantially non-porous material; and a partially restricted rear portion connected to the sleeve, said rear portion made of porous semi-rigid mesh material, said restricted portion providing sufficient resistance to the air stream passing through said sleeve so that the substantially non-porous material will cause said sleeve to become inflated and said porous mesh material will permit a sufficient quantity of the air from said airstream to pass through said mesh material in a substantially straight line to prevent fluttering of the rear portion of the trailer and to stabilize the flight of said trailer when towed at high speeds.

18. An aerial trailer comprising a sleeve as the main body portion, said sleeve having a partially restricted rear portion made of mesh material of a mesh size in the approximate range of 8 x 8 to 12 x 12 mesh per inch; and means for attaching said trailer to an aircraft or other vehicle.

19. An aerial trailer comprising a sleeve as the main body portion and having a rear portion made of a mesh material, said mesh being of a size in the range from 8 x 8 to 12 x 12 mesh per inch, said rear portion being restricted in diameter so as to provide sufficient flat plate area to cause said sleeve to inflate and yet having a sufficient central opening, together with the effective open area of said mesh in the rear of said sleeve to permit the air to spill through said trailer, said mesh, by allowing the air to pass therethrough, eliminating flutter in said sleeve; and means for attaching said sleeve to an aircraft or other vehicle.

20. An aerial trailer as defined in claim 18, in which the mesh material is made of wire.

21. An aerial trailer as defined in claim 19, in which the mesh material is made of coated wire.

22. An aerial trailer comprising a sleeve as the main body portion having a partially restricted rear portion made of a mesh woven of wire covered with an organic material.

23. An aerial trailer comprising a sleeve as the main body portion having a partially restricted rear portion made of a mesh woven of wire covered with cotton yarn.

FRANK G. MANSON.